United States Patent [19]
Futamura et al.

[11] Patent Number: 5,111,017
[45] Date of Patent: May 5, 1992

[54] POWER SUPPLY CIRCUIT FOR DISCHARGE MACHINING

[75] Inventors: Shoji Futamura, Kawasaki; Masaki Kurihara, Yokohama, both of Japan

[73] Assignee: Electrical Discharge Work's, Kanagawa, Japan

[21] Appl. No.: 564,053

[22] Filed: Aug. 7, 1990

[30] Foreign Application Priority Data

Aug. 16, 1989 [JP] Japan .................. 1-211076

[51] Int. Cl.$^5$ .................................. B23H 1/02
[52] U.S. Cl. .................................. 219/69.18
[58] Field of Search ............... 323/283, 285, 222, 224; 219/69.13, 69.18; 204/224 M

[56] References Cited

U.S. PATENT DOCUMENTS

| | | | |
|---|---|---|---|
| 4,450,337 | 5/1984 | Inoue | 219/69.18 |
| 4,695,785 | 9/1987 | Mieth et al. | 323/222 |
| 4,788,399 | 11/1988 | Mironoff | 219/69.18 |
| 4,940,872 | 7/1990 | Futamura | 219/69.13 |
| 4,964,029 | 10/1990 | Severinsky et al. | 323/224 |
| 4,978,829 | 12/1990 | Gurwicz | 219/69.13 |

FOREIGN PATENT DOCUMENTS 1-310818 12/1989 Japan .................. 219/69.13

Primary Examiner—Geoffrey S. Evans
Attorney, Agent, or Firm—McGlew & Tuttle

[57] ABSTRACT

A power supply circuit for discharge machining comprising a first switching means for supplying a d-c power voltage to a discharge gap between a discharge machining electrode and a workpiece, a first energy consumption circuit having a second switching means provided on the output side of the first switching means, and a second energy consumption circuit having a third switching means provided in the vicinity of the discharge gap in parallel therewith, in which the second switching means of the first energy consumption circuit and the third switching means of the second energy consumption circuit are caused to conduct after the first switching means is turned off.

5 Claims, 4 Drawing Sheets

POWER SUPPLY CIRCUIT FOR DISCHARGE MACHINING

BACKGROUND OF THE INVENTION

1. Field of the Invention

This invention relates generally to a power supply circuit for discharge machining, and more particularly to a power supply circuit constructed so as to apply a d-c power voltage to a discharge gap between a discharge machining electrode and a workpiece via a switching means, in which discharge machining speed is improved by reducing the off time of the switching means by quickly discharging the energy stored in the lead wires after the switching mans is turned off.

2. Description of the Prior Art

FIG. 4 shows the construction of a power supply circuit for discharge machining of a conventional type. FIG. 5 is a diagram of assistance in explaining the waveforms generated in the circuit shown in FIG. 4.

In FIG. 4, numeral 1 refers to a workpiece; 2 to a discharge electrode; 3 to a d-c power supply from which a d-c voltage is impressed across the workpiece 1 and the discharge electrode 2. Numeral 4 refers to a transistor constituting a switching means for applying a voltage across the workpiece 1 and the discharge electrode 2. Numeral 41 refers to a resistor; 42 to a diode; symbol $L_o$ to the inductance of lead wires; G1 to a gate voltage of the transistor 4; I to a current; E to a voltage; $R_g$ to a gap resistance, respectively.

First, a voltage such as G1 shown in FIG. 5, is applied to the gate of the transistor 4. As the gate voltage G1 is applied, the transistor 4 is turned on, causing a d-c voltage E3 to be applied across the workpiece 1 and the discharge electrode 2 from the d-c power supply 3. At this time, control is effected so that the discharge electrode 2 gradually comes near the workpiece 1, and that the voltage E3 across the workpiece 1 and the discharge electrode 2 is kept high until discharge begins, and decreased to a lower level after discharge begins.

When the transistor 4 is turned off, the energy stored in the inductance $L_o$ of the lead wires by a current I1 flowing in the discharge gap between the workpiece 1 and the discharge electrode 2 turns into a current I2, which in turn flows through a gap resistance $R_g$ in the discharge gap via the diode 42. The gap resistance $R_g$ is determined by a working liquid, machining chips a stray capacity, etc. Although the energy stored in the inductance $L_o$ of the lead wires is, as a rule, reduced exponentially through the gap resistance $R_g$ because of the existence of the diode 42, the OFF period during which the transistor 4 is kept in the off state has to be made longer because waiting time is needed until the current I2 becomes zero. That is, if the voltage E3 exists in the discharge gap due to the energy stored in the inductance $L_o$ or the energy stored in the stray capacities $C_o$ and $C_G$, there arises a problem of the difficulty in removing machining chips, free carbon and other floating substances out of the discharge gap. If the d-c voltage E3 is applied across the workpiece 1 and the discharge electrode 2 in the presence of these floating substances in the discharge gap, discharge is unwantedly concentrated, leading to arc discharge. Generation of arc discharge causes the working surface to be roughened, accelerating the consumption of the electrode, or causing discharge machining to be interrupted. To cope with this, the OFF period during which the transistor 4 is kept in the off state has to be made longer, as noted earlier. The longer OFF period, however, leads to an unwanted problem of lowered machining speed.

SUMMARY OF THE INVENTION

It is an object of this invention to provide a power supply circuit for discharge machining constructed so as to supply a d-c voltage across a discharge electrode and a workpiece via a switching means, in which the discharge off period is reduced to improve machining speed by providing energy consumption circuits to rapidly discharge the energy stored in the inductance of lead wires, etc. and the energy stored in stray capacities after the switching means is turned off.

It is another object of this invention to improve machining speed and the surface roughness of the machining surface by discharging the energy stored in the inductance of the lead wires, etc. after the switching means is turned off, thereby facilitating the discharge of machining chips and free carbon, and preventing arc discharge.

It is still another object of this invention to make it possible to perform discharge machining of a kind, such as the machining of small holes, in which machining chips and free carbon are hard to be discharged out of the discharge gap, by facilitating the discharge of machining chips, free carbon and other floating substances.

It is still another object of this invention to reduce the consumption of the electrode by making it possible to reduce the discharge off period.

DETAILED DESCRIPTION OF THE EMBODIMENTS

Figure 1:
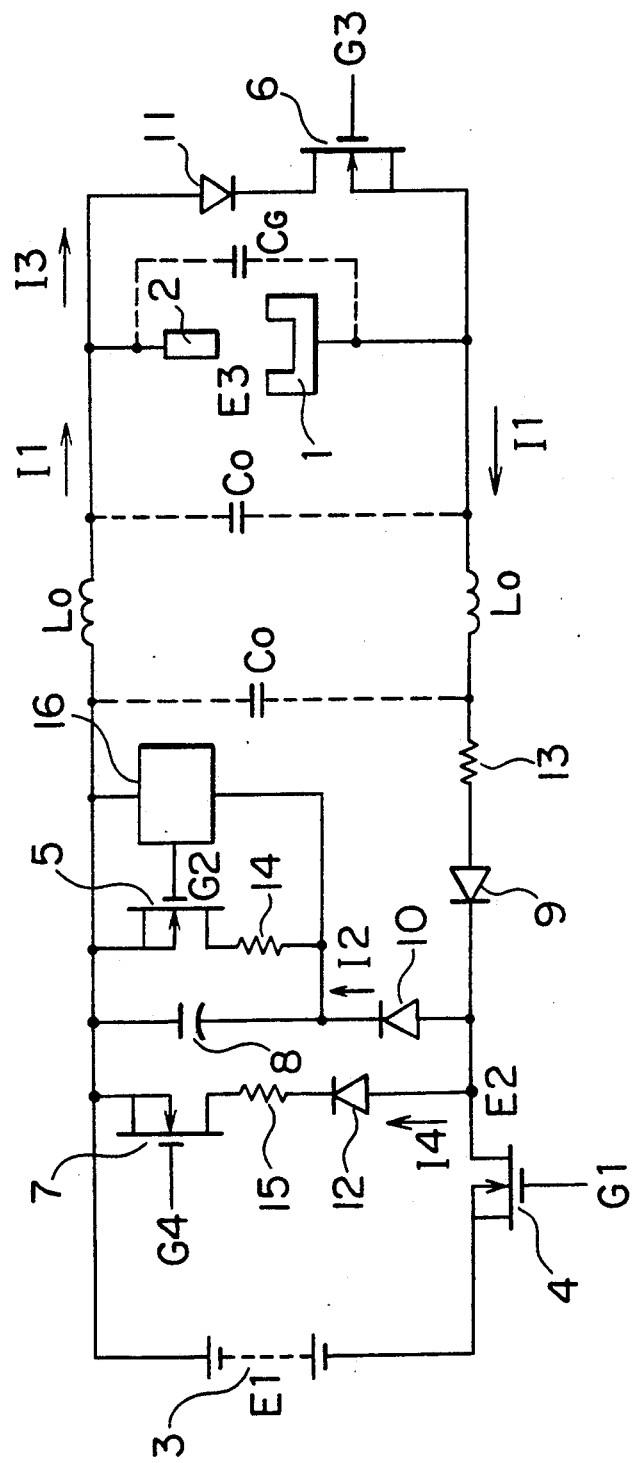
FIG. 1 is a diagram of assistance in explaining an embodiment of this invention.

FIG. 1 is a diagram illustrating the construction of a power supply circuit for discharge machining embodying this invention. Reference numeral 1 in the figure refers to a workpiece; 2 to a discharge electrode; 3 to a d-c power supply; 4 through 7 to transistors; 8 to a capacitor; 9 through 12 to diodes; 13 through 15 to resistors; and 16 to a gate control circuit for the transistor 5, respectively. Symbol $L_o$ refers to an inductance of lead wires; I to a current; E to a voltage; G to the gate voltage of each transistor, respectively.

The embodiment shown in FIG. 1 has the following construction. That is, a first switching means consisting of a transistor 4 controlled by a gate voltage G1 for supplying a voltage E3 to a discharge gap between a workpiece 1 and a discharge electrode 2 is provided. A first energy consumption circuit in which a diode 10 is connected to a parallel circuit consisting of a second switching means having a capacitor 8 and a transistor 5 and a resistor 14 on the output side of the first switching mean is also provided. Furthermore, a gate control circuit 16 of the first energy consumption circuit, which outputs a gate voltage G2 for controlling the transistors 5 in accordance with the charging voltage level of the capacitor 8, is provided. A second energy consumption circuit consisting of a transistor 6 and a diode 11 of a third switching means, provided in parallel with the discharge gap and controlled by a gate voltage G3 is provided. A third energy consumption circuit consisting of a transistor 7, a resistor 15 and a diode 12 of a fourth switching means, provided in parallel with the first energy consumption circuit and controlled by a gate voltage G4 is provided. The embodiment has such a construction that the transistor 6 of the second energy consumption circuit is caused to conduct after the transistor 4 of the first switching means is turned off, and the transistor 7 of the third energy consumption circuit is caused to conduct when at least the voltage E3 applied to the discharge gap falls below a predetermined voltage.

In FIG. 1, when the transistor 4 is turned off and at the same time, the transistor 6 is turned on, the energy stored in the inductance $L_o$ of the lead wires by the discharge current I1 flowing across the workpiece 1 and the discharge electrode 2 is discharged through the capacitor 8 of the first energy consumption circuit. And as a result, the capacitor 8 is charged. The charge current of the capacitor 8 is monitored by the gate control circuit 16 of the first energy consumption circuit so that a gate voltage G2 is applied to the gate of the transistor 5 of the first energy consumption circuit as the charge current of the capacitor 8 reaches a predetermined voltage level. With this, the transistor 5 is turned on. As a result, the charge stored in the capacitor 8 is discharged in the transistor 5 of the first energy consumption circuit. Consequently, as the voltage in the capacitor 8 is kept at a predetermined value, the energy stored in the inductance $L_o$ is consumed via the first energy consumption circuit.

When the voltage E2 applied to the transistor 4 falls below the voltage of the capacitor 8, the transistor 7 in the third energy consumption circuit provided in parallel with the first energy consumption circuit is caused to conduct, and thus the aforementioned energy is rapidly consumed through this switch. Consequently, an oscillating current is prevented from being generated across the workpiece 1 and the discharge electrode 2, an unwantedly high voltage is prevented from being applied to the transistor 4 of the first switching means since the voltage of the capacitor 8 is kept at a predetermined value. As a result, the energy stored in the inductance $L_o$ of the lead wires can be quickly discharged, and the OFF period during which the transistor 4 is kept in the off state can be reduced. In other words, the OFF period $T_{OFF}$ shown in FIG. 2, which will be described later, can be made shorter.

Next, the operation of the embodiment shown in FIG. 1 will be described in detail, referring to FIG. 2. When the transistor G1 is turned on after the lapse of a predetermined OFF period $T_{OFF}$ shown in FIG. 2, a voltage is applied across the workpiece 1 and the discharge electrode 2. Since control is effected so that the discharge electrode 2 draws near the workpiece 1, discharge takes place at the discharge gap upon application of the voltage. The fact that the voltage E3 shown in FIG. 2 rapidly drops represents the ocurrence of discharge. After the lapse of a predetermined time T from the point of time at which the discharge takes place, the transistor G1 is turned off. That is, the ON time $T_{ON}$ shown in FIG. 2 in which the transistor G1 is in the on state is terminated. In the following, description will be made in more detail, placing emphasis on energy consumption.

Figure 2:
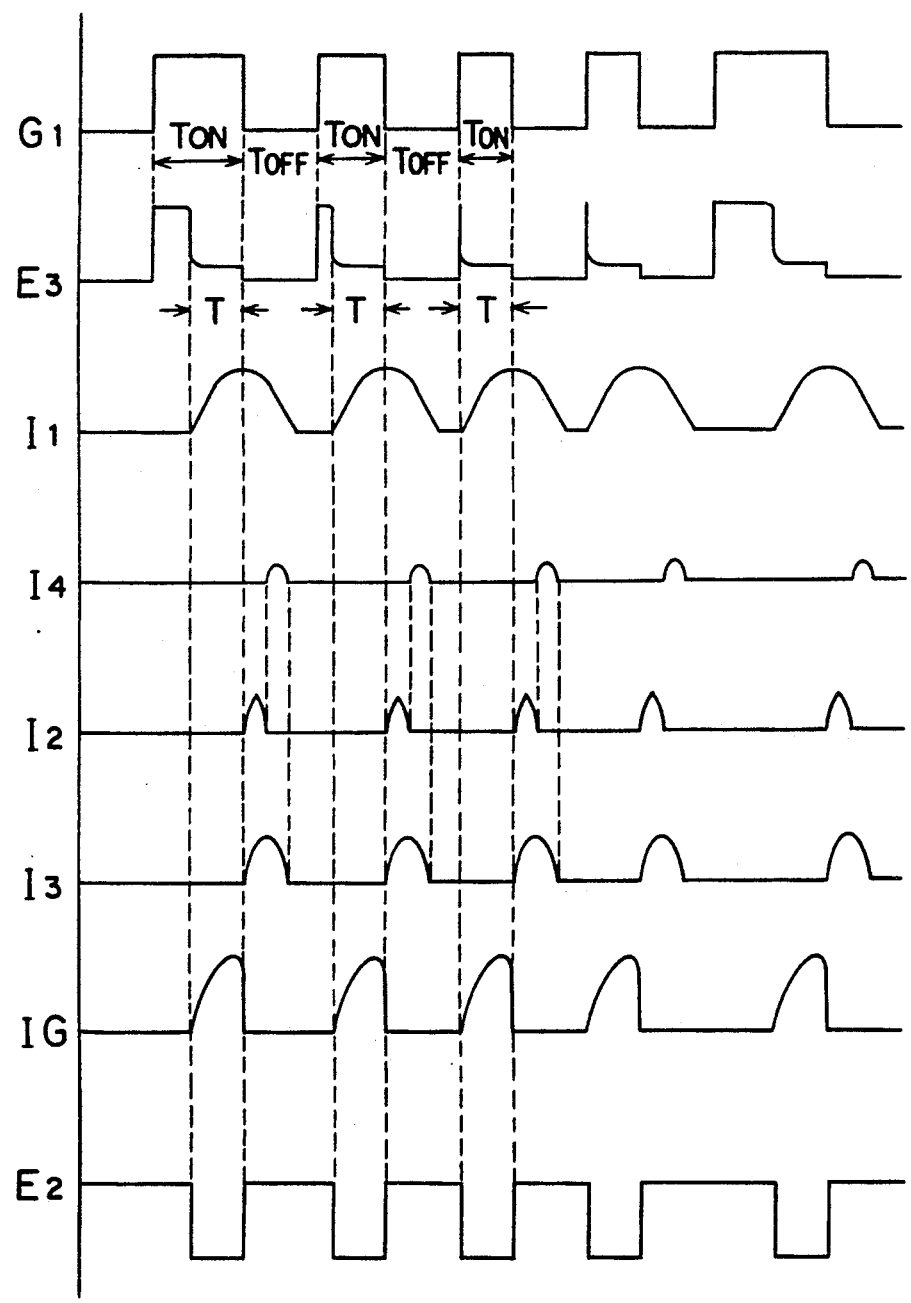
FIG. 2 is a diagram of assistance in explaining waveforms produced in the embodiment shown in FIG. 1.

When the gate voltage G1 shown in FIG. 2 is applied to the gate of the transistor 4, the transistor 4 is turned on, causing the d-c voltage E3 to be applied across the workpiece 1 and the discharge electrode 2 via the inductance $L_o$ of the lead wires. Next, discharge takes place across the workpiece 1 and the discharge electrode 2, causing the workpiece 1 to be machined. Since control is effected so that the discharge gap between the workpiece 1 and the discharge electrode 2 is gradually reduced, changes in the voltage across the workpiece 1 and the discharge electrode 2 at this time are indicated as E3 in FIG. 2.

During the period where the transistor 4 is kept in the off state, control is effected so that the transistor 6 is turned on, that is, both transistors are placed alternately in the opposite state to each other.

During the period where the transistor 4 is turned on, the energy stored in the inductance $L_o$ of the lead wires and the energy stored in the stray capacities $C_o$ and $C_G$ are discharged, as shown by I2 in FIG. 2, as the transistor 4 is turned off. This causes the capacitor 8 to be charged via the resistor 13, the diode 9 and the diode 10. The charging voltage of the capacitor 8 is monitored by the gate control circuit of the transistor 5, and when the charging voltage of the capacitor 8 reaches a predetermined voltage, a pulse voltage G2 is applied to the gate of the transistor 5. With this, the transistor 5 is turned on, and the electric charge in the capacitor 8 is consumed via the resistor 14 and the transistor 5. And, as the voltage of the capacitor 8 is kept at a predetermined value, the energy stored in the inductance $L_o$ is consumed. Even during this period, the transistor 6 is kept in the ON state, preventing the current I1 from flowing across the discharge gap having a gap resistance. As a result, no voltage is applied to the discharge gap, and machining chips and other floating substances in the discharge gap are removed in the early stage.

When the voltage E2 applied to the transistor 4 falls below the voltage of the capacitor 8 that is held at a predetermined voltage, the energy stored in the aforementioned inductance $L_o$ cannot be discharged via the first energy consumption circuit. This may cause oscillation through the stray capacities in the circuit. To prevent this phenomenon, the energy is caused to be consumed in a non-oscillating fashion by turning on the transistor 7, that is, via the third energy consumption circuit. By doing so, the energy stored in the inductance $L_o$ of the lead wires is rapidly consumed via the transistors 6 and 7.

In the embodiment shown in FIG. 1, as described above, the energy stored in the inductance of the lead wires and the energy stored in the stray capacities $C_o$ and $C_G$ are rapidly consumed in a non-oscillating fashion via the energy consumption circuits of the transistors 5 through 7 during the OFF period of discharge machining. As a result, the discharge off period can be reduced considerably. Keeping the voltage across the discharge gap at zero permits machining chips and free carbon in the discharge gap to be discharged easily. Consequently, the aforementioned energies can be rapidly consumed without allowing discharge to develop into arc discharge, thus making it possible to reduce the discharge off period and further improve machining speed.

Figure 3:
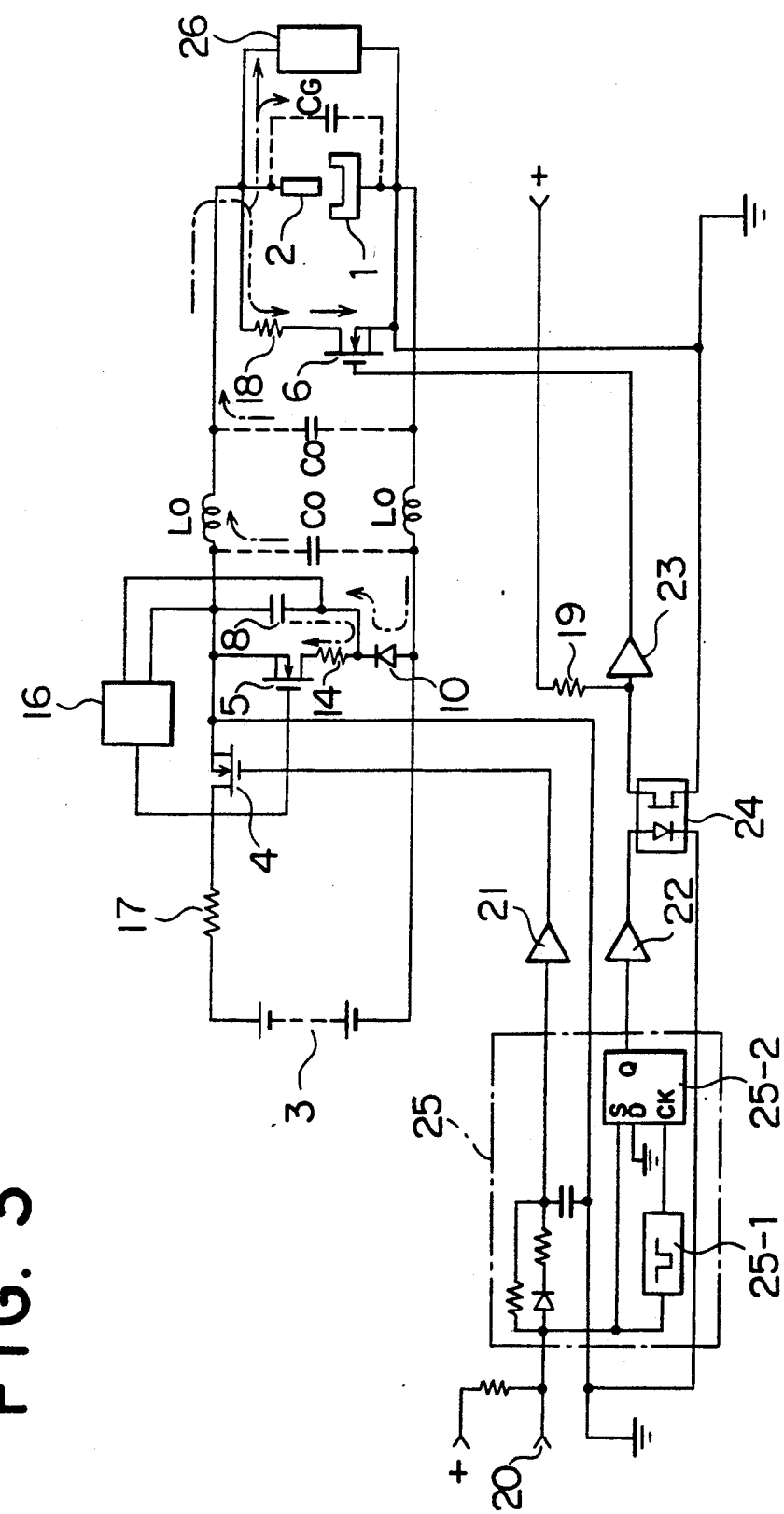
FIG. 3 is a diagram of assistance in explaining another embodiment of this invention.
Figure 4:
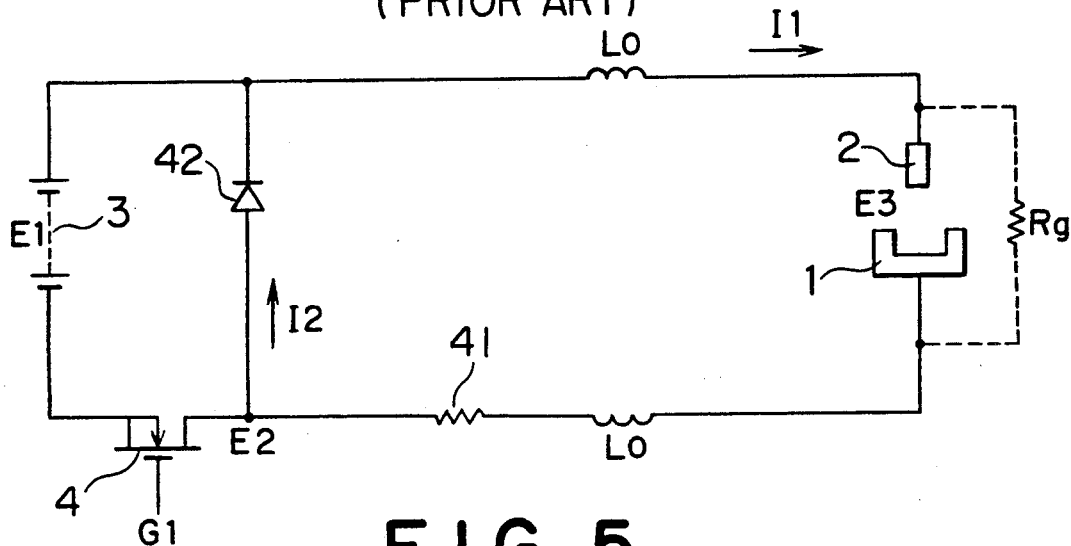
FIG. 4 is a diagram illustrating the construction of the prior art.
Figure 5:
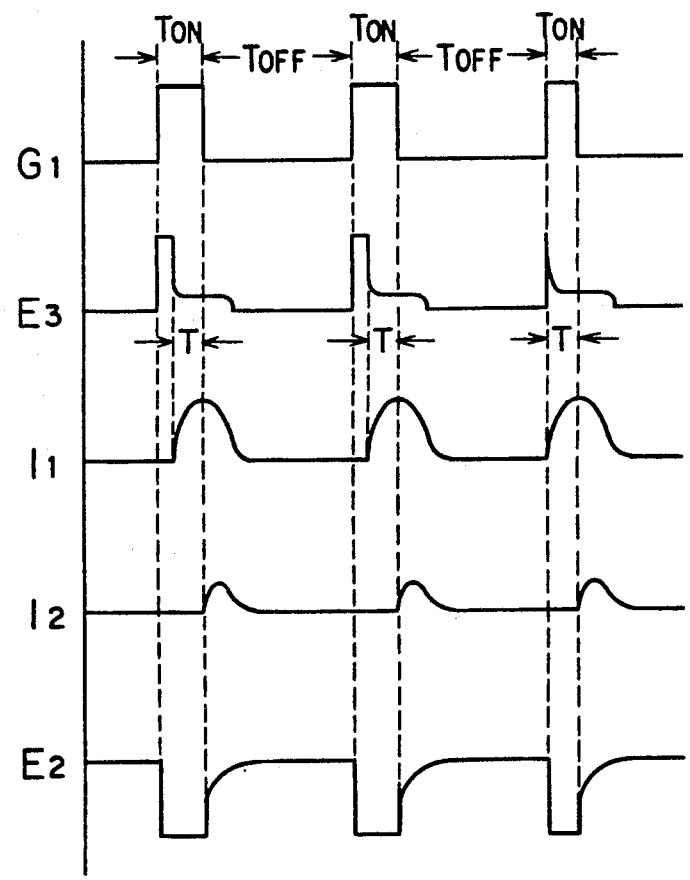
FIG. 5 is a diagram of assistance in explaining waveforms produced in the prior art shown in FIG. 4.

FIG. 3 is a diagram illustrating another embodiment of the power supply circuit for discharge machining of this invention. This embodiment is essentially the same as the aforementioned embodiment shown in FIG. 1, except that the third energy consumption circuit (transistor 7, resistor 15 and diode 12) shown in FIG. 1 is omitted. In FIG. 3, like numerals correspond to like parts shown in FIG. 1. Numerals 17 through 19 refer to resistors; 20 to a pulse input terminal; 21 through 23 to buffers; 24 to a photocoupler; 25 to an input pulse waveform shaping section; 25-1 to a monostable multivibrator; and 25-2 to a flip-flop, respectively. Numeral 26 refers to a gap voltage detecting means for detecting the voltage in a discharge gap between the workpiece 1 and the discharge electrode 2. In the following, the operation of the circuit shown in FIG. 3 will be described in detail for the period in which the input pulse inputted from the pulse input terminal 20 is in the off state and the period in which the input pulse is in the off state.

(1) Operation in the period where the input pulse 20 is in the on state

The transistor 4 is turned on by a signal coming from the buffer 21. This causes the voltage of the d-c power supply 3 to be applied to the discharge gap.

The transistor 5, however, is not conducting because a reverse voltage is applied to the transistor 5 as long as the transistor 4 is kept turned on.

The transistor 6 constituting another part of the energy consumption circuit remains in the off state as no ON gate signal is given. This is because when a signal obtained by shaping the waveform of the input pulse in the monostable multivibrator 25-1 and the flip-flop 25-2 is inputted, the output resistance of the photocoupler 24 is reduced, with the result that a current flows in the photocoupler 24 via the resistor 19. As a result, the potential of the input terminal of the buffer 23 drops, and the potential of the output terminal also drops. Consequently, no ON signal is supplied to the gate of the transistor 6, which is therefore kept in the OFF state.

In this state, the discharge electrode 2 is adapted to descend so as to reduce the discharge gap. Thus, discharge takes place in the discharge gap to machine the workpiece 1. The gap voltage detecting means 26 detects the occurrence of discharge. Then, a predetermined time is counted from the point of time at which the discharge is started by an appropriate means which is not shown in the figure, and the aforementioned input pulse 20 is turned off after the lapse of that predetermined time.

(2) Operation in the period where the input pulse 20 is in the off state

When the input pulse 20 is turned off, the transistor 4 is turned off, interrupting the supply of the discharge voltage.

When the input pulse 20 is turned off, the transistor 6, which is part of the energy consumption circuit, is turned on. This is because when the input pulse 20 is turned off, the output of the buffer 22 becomes zero, with the result that no current flows to the input side of the photocoupler 24, causing the output resistance thereof to increase. As a result, the voltage applied to the input terminal of the buffer 23 through the resistor 19 is increased, and the output voltage is also increased. That is, a gate voltage is supplied to the transistor 6. On the other hand, the voltage generated by the energies stored in the lead wire inductance $L_o$, the stray capacity $C_o$ and the discharge gap capacitance $C_G$ is applied across the source and the drain of the transistor 6 in the form of a forward voltage. This causes the transistor 6 to be turned on.

As the transistor 4 is turned off and the transistor 6 is turned on, the current generated by the energy stored in the line flows through the transistor 6→the diode 10→the capacitor 8, as indicated by an alternate long and short dash line in the figure. That is, part of the aforementioned energy is consumed in the form of Joule heat as the current flows, with the remainder being transferred to the capacitor 8 as a charge.

This eliminates an unwanted state where a charge is left in the gap during the period in which the transistor 4 of the first switching means is turned off, thus the voltage is not allowed to become zero.

As the capacitor 8 is charge whenever the transistor 4 is turned on and off, the charged voltage is gradually increased. When the voltage in the capacitor 8 reaches a predetermined value, the gate control circuit 16 of the transistor 5 detects that voltage, transmitting an ON signal to the transistor 5. When the transistor 5 is turned on, the capacitor 8 is discharged via the resistor 14→the transistor 5. That is, the energy stored in the capacitor 8 is consumed in the form of Joule heat as the energy flows in the resistor 14 and the transistor 5.

The transistor 5 may be of inferior switching characteristics to the transistor 4 because the role of the transistor 5 is merely to turn on only when the voltage of the capacitor 8 reaches a predetermined value as the transistor 4 is turned on and off several times.

The duration of a single voltage pulse to be fed for discharge machining should preferably be shorter wherever practicable to prevent rusting due to ionization (electrolysis). Even when pulses having a short rectangular waveform are successively supplied, the energy stored in the line is rapidly consumed by the action of the energy consumption circuit. This helps avoid an unwanted state where a voltage is applied at all times to the discharge gap.

As described above, any large energy is no longer stored in the discharge gap during the discharge off period between discharging operations in the embodiment shown in FIG. 3. This prevents rusting due to electrolysis and facilitates the removal of machining chips out of the discharge gap. In addition, the OFF period $T_{OFF}$ shown in FIG. 2 can be made sufficiently short, and thus machining speed can be increased by increasing the number of discharge per unit time.

What is claimed is:

1. A power supply circuit for discharge machining comprising a discharge machining electrode and a workpiece defining a discharge gap, a first switching means for supplying a d-c power voltage to the discharge gap between the discharge machining electrode and the workpiece, a first energy consumption circuit having a second switching means provided on an output side of said first switching means, and a second energy consumption circuit having a third switching means provided in parallel with said discharge gap, said second switching means of said first energy consumption circuit and said third switching means of said second energy consumption circuit are caused to conduct after said first switching means is turned off.

2. A power supply circuit for discharge machining as set forth in claim 1 wherein said first energy consumption circuit has a capacitor connected in parallel with said second switching means, and a gate control circuit for controlling said second switching means in accordance with the charging level of said capacitor.

3. A power supply circuit for discharge machining as set forth in claim 2 wherein said first energy consumption circuit has a diode connected in series with said capacitor.

4. A power supply circuit for discharge machining as set forth in claim 1 or 2 wherein a third energy consumption circuit consisting of a fourth switching means connected in parallel with said first energy consumption circuit.

5. A power supply circuit for discharge machining as set forth in claim 4 wherein said fourth switching means of said third energy consumption circuit is turned on after energy consumption in said first energy consumption circuit proceeds for a predetermined duration of time, and turned off before said first switching means becomes conducting.

* * * * *